(12) United States Patent
DuBois

(10) Patent No.: US 7,984,613 B2
(45) Date of Patent: *Jul. 26, 2011

(54) GEOTHERMAL POWER GENERATION SYSTEM AND METHOD FOR ADAPTING TO MINE SHAFTS

(75) Inventor: John R. DuBois, Palm Beach Gardens, FL (US)

(73) Assignee: Mine-RG, Inc., Palm Beach Gardens, FL (US)

( * ) Notice: Subject to any disclaimer, the term of this patent is extended or adjusted under 35 U.S.C. 154(b) by 796 days.

This patent is subject to a terminal disclaimer.

(21) Appl. No.: 11/936,821

(22) Filed: Nov. 8, 2007

(65) Prior Publication Data

US 2009/0120090 A1 May 14, 2009

(51) Int. Cl.
*F03G 7/00* (2006.01)
(52) U.S. Cl. ............. 60/641.2; 290/1 R; 290/44; 290/55
(58) Field of Classification Search ...... 60/641.2–641.4; 290/1 R, 44, 55
See application file for complete search history.

(56) References Cited

U.S. PATENT DOCUMENTS

| | | | |
|---|---|---|---|
| 3,894,393 A | 7/1975 | Carlson | |
| 3,988,896 A | 11/1976 | Matthews | |
| 3,991,817 A | 11/1976 | Clay | |
| 4,018,543 A | 4/1977 | Carson et al. | |
| 4,070,131 A | 1/1978 | Yen | |
| 4,106,295 A | 8/1978 | Wood | |
| 4,109,305 A | 8/1978 | Claussen et al. | |
| 4,157,014 A | 6/1979 | Clark, Jr. | |
| 4,297,847 A | 11/1981 | Clayton | |
| 4,453,383 A | 6/1984 | Collins | |
| 4,497,177 A | 2/1985 | Anderson | |
| 4,507,916 A | 4/1985 | Anderson | |
| 4,779,006 A | 10/1988 | Wortham | |
| 4,801,811 A | 1/1989 | Assaf et al. | |
| 5,047,654 A | 9/1991 | Newman | |
| 5,095,705 A | 3/1992 | Daly | |
| 5,096,467 A | 3/1992 | Matsui | |
| 5,284,628 A * | 2/1994 | Prueitt | 422/168 |
| 5,300,817 A * | 4/1994 | Baird | 290/55 |
| 5,734,202 A | 3/1998 | Shuler | |
| 6,237,284 B1 | 5/2001 | Erickson | |
| 6,253,700 B1 | 7/2001 | Gorlov | |
| 6,943,461 B2 | 9/2005 | Kaploun | |
| 6,981,839 B2 | 1/2006 | Fan | |
| 7,026,723 B2 | 4/2006 | Moreno | |
| 7,059,131 B2 | 6/2006 | Hildebrand | |

(Continued)

OTHER PUBLICATIONS

R. Rohatensky, "Shpegs—Solar Heat Pump Electrical Generation System, A new system for open, location independent, reliable, clean and renewable energy", pp. 1-7, http://www.shpegs.org (downloaded Aug. 20, 2009).

"First successful demonstration of carbon dioxide air capture technology achieved", Earth Institute at Columbia University, pp. 31-33, http://www.physorg.com/printnews.php?newsid=96732819.

(Continued)

*Primary Examiner* — Hoang M Nguyen
(74) *Attorney, Agent, or Firm* — McHale & Slavin, P.A.

(57) ABSTRACT

A geothermal power system for production of power, and in particular electrical energy, utilizing naturally occurring geothermal energy sources and a method for identifying and converting manmade and natural geological formations into a substantial source of energy and at the same time providing remediation of environmental and safety hazards. Utilizing surface air that is substantially cooler than the geothermal temperature of the subterranean cavern an induced air flow will be produced. This naturally induced air flow will be harnessed and provide the energy to the system power plants for production of electrical energy.

26 Claims, 6 Drawing Sheets

U.S. PATENT DOCUMENTS

| | | |
|---|---|---|
| 7,062,911 B2 | 6/2006 | Yang |
| 7,086,823 B2 | 8/2006 | Michaud |
| 7,132,090 B2 | 11/2006 | Dziedzic et al. |
| 7,132,760 B2 | 11/2006 | Becker |
| 7,621,129 B2 * | 11/2009 | DuBois ................ 60/641.2 |
| 2006/0289003 A1 | 12/2006 | Lackner et al. |
| 2007/0048848 A1 | 3/2007 | Sears |
| 2007/0217982 A1 | 9/2007 | Wright et al. |

OTHER PUBLICATIONS

J. Stolaroff, "Capturing CO2 from ambient air: a feasibility assessment", Carnegie Mellon University Ph.D. Thesis, pp. 1-95 (Aug. 17, 2006).

K. Lackner et al, "Capturing carbon dioxide from air", Columbia University, pp. 1-15.

* cited by examiner

GEOTHERMAL POWER GENERATION SYSTEM AND METHOD FOR ADAPTING TO MINE SHAFTS

FIELD OF THE INVENTION

The present invention relates to a system for production of power. The invention will produce large quantities of mechanical energy from naturally occurring geothermal sources which can be converted into electrical energy.

BACKGROUND OF THE INVENTION

Geopolitical events can have dramatic repercussions on the availability of petroleum exported from the world's petroleum producing nations. It is therefore apparent that industrial as well as developing nations cannot rely on these petroleum producing countries for a consistent and reliable source of petroleum. Likewise, it is becoming increasing more difficult to locate new sources of petroleum and more apparent that there is only a finite quantity of easily accessible petroleum. Green house gases as well as global warming are also of critical importance when considering the impact of new power production and electrical power generation facilities. For these and other reasons as well, petroleum based combustion type power generation is undesirable. Likewise, nuclear energy is thought of by the general public to be highly dangerous, undesirable, wherein the vast majority of people are opposed to the construction of nuclear facilities. In addition, the disposal of spent nuclear fuel also presents numerous problems and challenges in terms of nuclear accidents and potential acts of terrorism. Public opinion concerning nuclear power generation is therefore very negative and makes its utilization politically unacceptable.

The geothermal energy contained within the earth represents an almost infinite amount of potential energy. The ability to extract this energy in an efficient, cost effective and environmentally safe way has to date proven to be a daunting challenge.

Over the course of the last several hundred years, mankind has created numerous subterranean passageways through the earth for the purpose of extracting minerals, and metal ores. In addition to the current active mines there are also numerous abandoned mines located around the world. These abandoned mines are generally unmarked and unsealed from public access. An abandoned mine may well contain an open yet visually obscured hole that could descend tens if not hundreds of feet in depth. They serve no useful purpose and in fact pose a threat to the safety and well being for those who unwittingly approach the area of an abandoned mine.

The use of an abandoned mine for capturing geothermal energy provides an efficient and cost effective way of tapping geothermal energy from the earth while at the same time providing an environmentally friendly solution to an existing public environmental hazard. There are literally hundreds of thousands of abandoned underground mines throughout the world. Their labyrinths of vertical and horizontal shafts descend deeply into the earth, some of them thousands of feet below the surface. Once the desired ore deposits were found—gold, silver, copper, coal other minerals, or even diamonds—great caverns were excavated and the raw materials were extracted from the earth. The ore was hauled to the surface and processed, usually contaminating the water and scarring the surrounding lands. Once the mines had outlived their usefulness, they were just simply abandoned. Many of these mines have been in existence for over 100 years.

According to a study published in 1996 by the US General Accounting Office (Federal Land Management: Information on Efforts to Inventory Abandoned Hard Rock Mines, GAO/RCED-96-30, February 1996), "no definitive inventory is available concerning the number of abandoned hard rock mines located on federal lands." However one agency estimate cited in the GAO report indicates that there may be over 560,000 abandoned hard rock mines in the US alone (on both public and private land sites). One objective of the 1996 GAO report was to establish the hazards and estimated costs for remediation. To quote from their report, "The problems posed by abandoned hard rock mines can generally be classified as physical safety hazards or environmental degradation. Physical safety hazards, which can lead to human injury or death, may include concealed shafts or pits, unsafe structures, and explosives. Conditions causing environmental degradation may include drainage of toxic or acidic water, which could result in soil and groundwater contamination or biological impacts."

As for the estimated costs for remediation, the 1996 GAO report says, "No nationwide cost estimate for reclaiming abandoned hard rock mines on federal lands is available. Preparing accurate estimates of the reclamation costs requires detailed assessments, or characterizations, of the sites, involving physical inspection and in-depth evaluation of the problems at each site." According to the Report, the Bureau of Mines estimates between $4 billion to $35.3 billion to reclaim less than 30,000 sites on Interior and Forest Service lands. The Mineral Policy Center estimates between $33 billion to $72 billion to reclaim the 560,000 sites it projects are in existence nationally, regardless of whether the lands are publicly or privately owned.

Thus, what is needed in the art is a means for converting an abandoned mine into a geothermal source of energy to provide an efficient and cost effective way of tapping geothermal energy from the earth while at the same time providing an environmentally friendly solution to an existing public environmental hazard.

DESCRIPTION OF THE PRIOR ART

Geothermal powered electrical generating systems are known in the prior art. U.S. Pat. No. 4,453,383, to Collins, discloses an apparatus of generating electrical power using solar energy and an air mass rising from a mine shaft. The mine shaft has a shaft opening at approximately the ground level, and a lower end portion of the shaft includes an air inlet. A solar collector converts the sun's radiant energy into heat and heats a heat exchanger or working fluid as it passes through the solar collector to increase its temperature. A draft is induced into the mine shaft by rejecting heat from the heated working fluid, and the induced draft is used to produce electrical power. A control system operates a shaft dampener and the rate at which heat is stored in a primary reservoir so as to control the velocity of the air rising in the shaft and the power output of the electrical generator placed within the shaft.

Another type of power plant that draws its power from naturally occurring thermal energy is U.S. Pat. No. 3,894,393, to Carlson. This patent discloses a method and means for the generation of power from a controlled air flow, wherein an enclosed air mass is cooled at a high altitude below the temperature of the surrounding air. The air is isolated from the surrounding air by means of a large duct. The resulting cooler, denser air flows down the duct towards lower altitude and the energy of the falling air mass is extracted by means of a turbine generator.

Another type of power plant that draws its power from naturally occurring thermal energy is U.S. Pat. No. 4,497, 177, to Anderson. This patent discloses a duct system for use in directing an air current for operation of power generators. Air movement is obtained by use of a basin of water covered by a solar energy transmitting dome spaced a distance over the basin. A surface type heat exchanger is located in the water adjacent the bottom of the basin, and an air inlet passage is provided having one end which terminates above the water surface, beneath the dome an opposite end connected to the heat exchanger. A long air outlet passage in the form of a flexible duct is connected to the outlet from the heat exchanger, which outlet passage extends downwardly along the mountain slope. Venturi tubes are located along the air outlet passage, and vane driven devices are positioned at the venture tubes for operation by the cooled air flowing downwardly. An air valve at the bottom end of the air outlet passage controls the rate of flow there through.

U.S. Pat. No. 5,047,654 illustrates the use of a mine shaft which uses solar collectors to activate steam boilers within the mine shaft, which in turn drive generators for producing electrical power. The system relies on solar power conversion devices and locates key elements underground thereby decreasing thermal losses. A vertical mine shaft is used for transmitting collected solar flux from the above ground heliostat fields, down to an insulated boiler. The boiler converts injected water into superheated steam which drives a steam turbine connected to an alternator or generator producing electrical power.

U.S. Pat. No. 4,779,006, discloses a system for producing electrical energy including a stack shaped and positioned generally as the letter "J" and having an intake portion, an exhaust portion and a conveying portion there between together with a vacuum producing mechanism associated with the exhaust portion for causing air to move through the stack whereby a generator responsive to the moving air generates electricity.

Another patent of interest is U.S. Pat. No. 5,284,628 discloses the use of a convection tower for generating electricity. The evaporation of water sprayed in the tower is used to create strong airflows and to remove pollution from the air. Turbines in tunnels at the skirt section of the tower generate electricity.

Still another geothermal power plant is disclosed in U.S. Pat. No. 5,095,705, to Daly. Daly discloses a process for producing energy from introducing water down a borehole having a depth of at least 20,000 feet; providing a casing in the borehole of a certain diameter; introducing an internal pipe within the casing of a diameter less than the casing to define an annulus there between; providing a means to introduce quantities of water down the inner pipe at predetermined levels; providing an air turbine at the upper portion of the inner pipe so that when the water is introduced down the inner pipe a vacuum is established above the water flowing down the pipe, and air is sucked into the inner pipe through the blades of the air turbine to run the turbine; and allowing the water to turn to steam at the lower end of the inner pipe and returning the steam up the annulus between the inner pipe and the casing to the upper end of the casing and exiting the system.

U.S. Pat. No. 4,106,296, to Wood, discloses an air pressure differential energy generation system comprising a stack for conduction of air from a high to low atmospheric pressure level. A vapor injection device within the stack provides a method of filling the stack at least in part with water vapor. A heat exchanger is provided at the high atmospheric pressure end of the stack. A turbine is coupled to the heat exchanger and is impelled by the warmed air. An electrical generator is coupled to the turbine to produce electrical power.

U.S. Pat. No. 7,026,723, to Moreno, discloses a mountain supported solar chimney. The chimney receives air from a solar heat collector that heats the air below thereby creating an updraft of air. The air rises because of the difference in temperature and pressure between the base and the top of the chimney. The higher the difference in temperature and pressure the faster the air will rise. An array of turbines is driven by the air. At the top of the chimney a fine mist of electrically charged water, which is taken from the reservoir, is sprayed across the top of the tower thereby attracting pollution contained within the air. The water will fall because of gravity and will be collected in a second reservoir that will be sent down the mountain, through a pipe, to generate additional electrical power with a turbine.

Additionally, U.S. Pat. No. 4,801,811, to Assaf et al, discloses a method and apparatus for generating electricity by using an air dam located in the outlet of a canyon with an electrical generator positioned at the base of the air dam. The air in the canyon is cooled by spraying water into the air as it enters the canyon, and the cooled air flows downwardly towards the base of the dam and through the electrical generator. Preferably, the air dam is a flexible curtain covering the outlet of the canyon and suspension means are provided for suspending the flexible curtain at its top. The suspension means includes supports built into the canyon above the top of the curtain, the support preferably being a suspension cable suspended between towers on opposite sides of the canyon.

U.S. Pat. No. 4,507,916, to Anderson, is comprised of a ground supported dome with a plurality of air inlets adjacent to the bottom of the dome for admission of air thereto. A passage is formed in the earth having an inlet beneath the dome and having an outlet outside the dome at a level beneath the level of the air inlet. Cooling elements of a refrigeration system are located in the passage for cooling air contained therein beneath the temperature of the ambient air. The ambient air is drawn into the dome through the dome air inlets and moves in a cyclonic motion beneath the dome due to a Coriolos acceleration. The energy of the whirling cyclonic wind beneath the dome is harnessed by locating a wind operated means in the path thereof. A wind operated means consists of a plurality of blades, vanes or the like attached to a vertical shaft by arms whereby the blades are driven by the cyclonic motion of the air mass inside the dome thereby rotating the shaft and exploiting that energy by coupling the shaft to a generator.

U.S. Pat. No. 3,894,393, to Carlson, is entitled Power Generation Through Controlled Convection. The patent discloses a method and means for generation of power from a controlled airflow, wherein an enclosed air mass is cooled at a high altitude below the temperature of the surrounding air. Movement of the air within the duct is accomplished by an arrangement whereby the density of air within the duct is substantially different from the density outside the air duct. The resulting cooler, denser air flows down the duct toward lower altitude, and the energy of the falling air mass is extracted by means of a turbine generator.

SUMMARY OF THE INVENTION

The present invention provides a system for production of power, and in particular electrical energy, utilizing naturally occurring geothermal energy sources for conversion into electrical power. Based upon abandoned mining shafts, an avenue has been discovered through which geothermal energy can be extracted Surface level (cold) air is captured in an air induction chamber and enters a substantially vertical intake shaft located beneath the surface of the earth. The shaft is provided with an insulated intake conduit fluidly connected to the air induction chamber so as to keep the air cold as is descends into the earth until it reaches an existing horizontal shaft or underground cavern. The air induction chamber includes features within the chamber to create a vortex of spinning air as it enters the insulated intake conduit. This is used to create the most suction of atmospheric air and higher velocity as the air begins its descent. The descending airflow naturally increases in velocity. This is called a "stack-effect" and is similar to the whoosh of air one feels when elevator doors open in a high rise-building. This kinetic force is used for power generation by driving wind/turbine generators that are integrated with the substantially vertical insulated intake conduit. The air passes from the substantially vertical intake shaft into the underground cavern (or selected horizontal shaft) and into a passageway located within a heat exchanger located within the cavern. The air is warmed as it passes through the heat exchanger.

The heated air is exhausted through an insulated exhaust conduit located in a substantially vertical exhaust shaft and then back into the atmosphere. Optionally, to enhance the energy producing power during this exhaust segment a controlled "tornado effect" (air vortex) can be created. The substantially vertical insulated exhaust conduit can optionally be designed with wind/turbine generators to extract the energy from the moving air and subsequently convert the kinetic energy into electrical power. The insulated exhaust conduit is capped at the surface of the earth to protect the opening and control distribution of the air as it re-enters the atmosphere.

The invention also seeks to provide a solution for converting an environmental and safety hazard such as a mine, either active or abandoned, into a source of almost infinite energy potential.

Accordingly, it is a primary objective of the instant invention to provide a constructive use for abandoned mines so that the cost of mine remediation will become more justified.

It is a further objective of the instant invention to create an economic opportunity that is beneficial to society, not only by providing renewable non polluting energy, but also by removing many of the environmental and safety hazards which presently exist and are largely ignored. Additionally, the instant invention will provide an economic stimulus to the present and former mining towns where these geological formations are to be found.

It is yet another objective of the instant invention to reduce the production of green house gases by decreasing the amount of electricity produced by the combustion of hydrocarbon fuels.

It is a still further objective of the invention to provide significant amounts of alternative energy to reduce ones dependence upon the availability of petroleum products from oil exporting nations.

Other objectives and advantages of this invention will become apparent from the following description taken in conjunction with any accompanying drawings wherein are set forth, by way of illustration and example, certain embodiments of this invention. Drawings contained herein constitute a part of this specification and include exemplary embodiments of the present invention and illustrate various objects and features thereof.

DETAILED DESCRIPTION OF THE INVENTION

The present invention is based upon the identification and exploitation of geological formations wherein the ambient surface air temperature is cooler than the underground geothermal temperature. Mountainous mining areas are often substantially cooler than the inner earth, geothermal, temperature within the underground caverns of the mines. It being well recognized that cold air naturally descends and warm air rises. While the invention will be described with respect to mines, and in particular abandoned mines, it is to be understood that the invention could likewise be used in other types of natural or manmade geological formations such as missile silos, salt domes, tunnels, etc.

Figure 1:
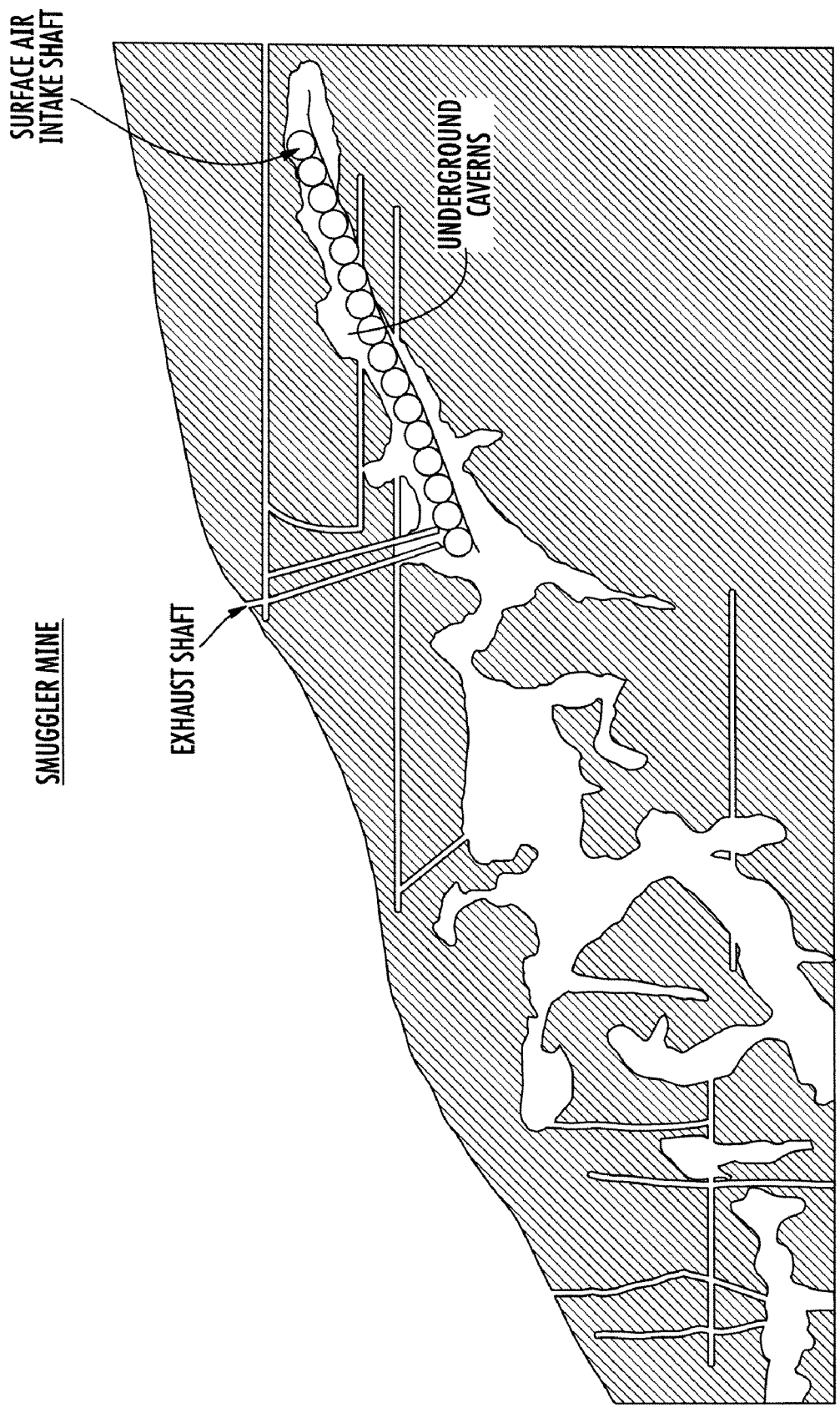
FIG. 1 is sectional view of the invention as it would be configured in the Smuggler Silver Mine in Aspen Colo.

Referring now to FIG. 1 of the drawings which contains an illustration of the Smuggler Mine located in Aspen, Colo. with a schematic showing how the instant invention would be used in this location. The Smuggler Mine is an historic site dating back to the early settlement of Colorado in the late 1800's. Aspen, Leadville, in fact, nearly all of Colorado's Western Slope settlements came into being because of mining activities. The Smuggler Mine is just one of potentially thousands of mines in Colorado that would be well suited for the disclosed geothermal power system. The Smuggler Mine stopped commercial mining activities many years ago. The mine is in generally good condition and is not considered a potential health risk to the community. The anticipated level of sub-surface remediation necessary to implement the geothermal power system is considered minimal. The physical characteristics of the Smuggler Mine are ideal for implementation of the geothermal power system of the instant invention. There are numerous mineshafts with diameters of at least 6 to 8 feet and with depths of between 500 and 1,000 feet that can be utilized. There are also multiple, massive underground caverns (stopes) and there is access to the mine system through large tunnels (avits) that remain in good condition. In addition, the temperatures within the mine caverns are high. It is believed that they range from 70 to over 100 degrees Fahrenheit. The ambient temperature at the surface of the earth in this mountainous region is low. Aspen's average temperature range between a low of 25 degrees and a high of 55 degrees Fahrenheit. Because of the differential between the atmospheric and internal mine temperatures, the mass of air that will be inducted into the geothermal power system will be substantial and will produce significant kinetic energy that can be converted into electrical power. As shown in FIG. 1 in general terms the geothermal power system includes an air intake, an air intake shaft, a cavern (or stope), and an air exhaust shaft. The system details are as follows.

Figure 2:
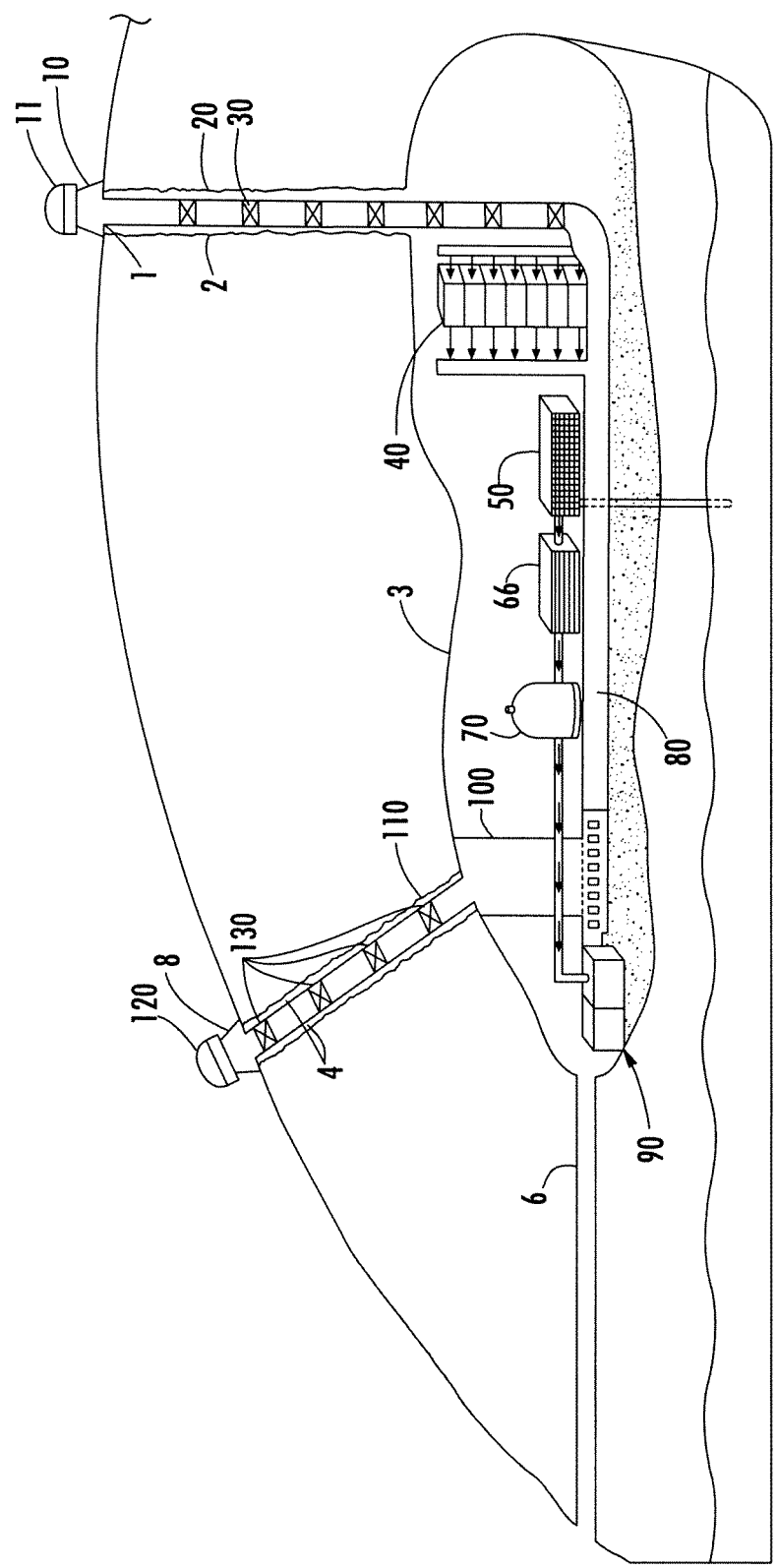
FIG. 2 is a sectional view of the geothermal power generation system showing the system components.

As shown in FIG. 2 the geothermal power system has an air inlet at the surface of the earth 1, a substantially vertical intake shaft 2, a horizontal passageway or cavern 4, an exhaust outlet 5, and a cavern access tunnel 6. Placed directly above air inlet lies an air induction chamber 11.

Figure 3:
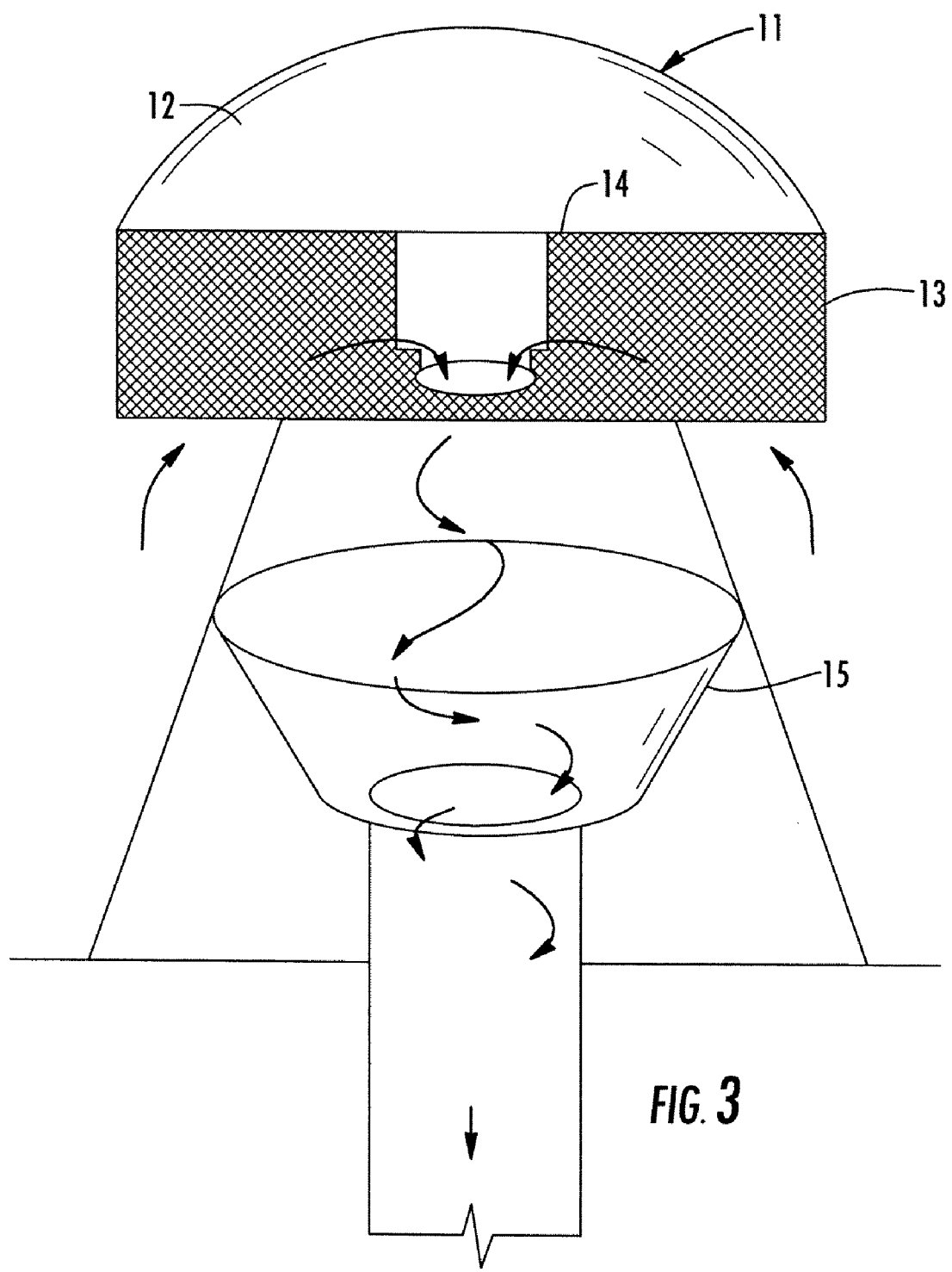
FIG. 3 is a side view of the air induction chamber including an air amplifier, and a vortex generating bowl.

The air induction chamber 11, shown in greater detail in FIG. 3 consists of an insulated dome or roof 12 an air intake 13 an air amplifier 14. The surface level ambient air is captured in an air induction chamber 11 and is then induced into a vortex generating bowl 15 which is fluidly connected to insulated intake conduit 20 located within the substantially vertical insulated intake shaft. The air induction chamber 11 is an above ground component of the system. It is a mushroom shaped structure built above the selected mineshaft. It is approximately 20 feet wide at the base with sides sloping to 15 feet. The roof is a 25 foot wide domed cap. The 5 foot overhang of the roof is used for air intake vents 13. The entire unit is about 20 feet tall. It protects the mineshaft opening and stands above the elements.

The contemplated building will be a custom designed monolithic dome which is constructed using an airform, polyurethane foam, steel reinforcing bar and shotcrete. These materials and construction techniques are also used in other system components. The result will be a cost-efficient, super-insulated and disaster-resistant building. The dome roof will be made into an energy generating solar collector using photovoltaic array or other methods currently available. The use of the solar energy will be used to dissipate the heat from the intake and further cool the atmospheric air as it is introduced into the chamber. The solar energy will also provide the energy to run the air intake components The intake chamber 11 houses the air intake components and other key equipment such as electrical transformers, communications equipment and a davit (not illustrated) for shaft maintenance. Vents 13 on the overhanging portion of the domed roof allow the atmospheric air to be pulled into the chamber for protection from the rain and snow. Also within the intake chamber is an air compressor (not illustrated) and an air amplifier 14. Using these as starting devices within the chamber, the suction of atmospheric air through the vents is optimized. A vortex bowl 15 is used to create a spinning motion to the air, sealing pressurizing and increasing the velocity of the airflow as it enters the air intake conduit.

Figure 4:
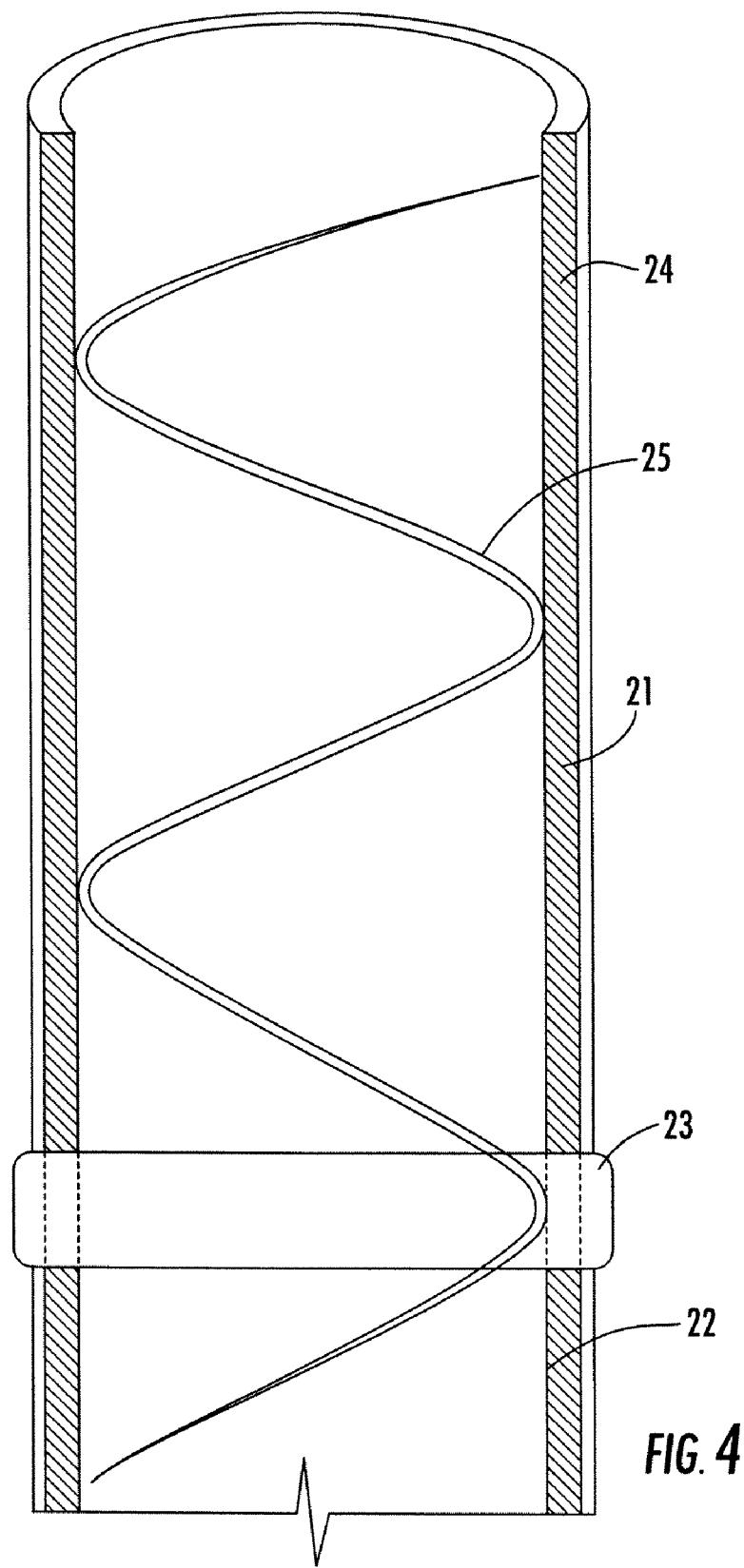
FIG. 4 is a cross sectional view the insulated conduit located within a substantially vertical shaft extending between the surface of the earth and the subterranean cavern.

The substantially vertical intake shaft 2 and the insulated intake conduit mounted therein can descend many hundreds of feet into the cavern 3 where the cold air will be warmed and processed. The intake shaft 2 should be a minimum of six feet in diameter. As it exists, the intake shaft 2 will have rough stone walls with possibly intersecting horizontal shafts intersecting its path. This will cause friction, slow down the flow of air and also allow air to escape. To seal the intake shaft and optimize the flow of air, permanent intake conduit 20 must be installed. As shown in FIG. 4 the intake conduit is constructed in interlocking sections, shown by way of example, as sections 21 and 22 that are joined by connector 23. The entire length of the air intake conduit is constructed in a similar fashion and covered with insulation material 24. Extending radially inward from the interior wall of conduit is a helical rib 25 extending along the length of the conduit. This helical rib 25, or rifling, imparts a vortex like flow to the mass of air passing there through.

Figure 5:
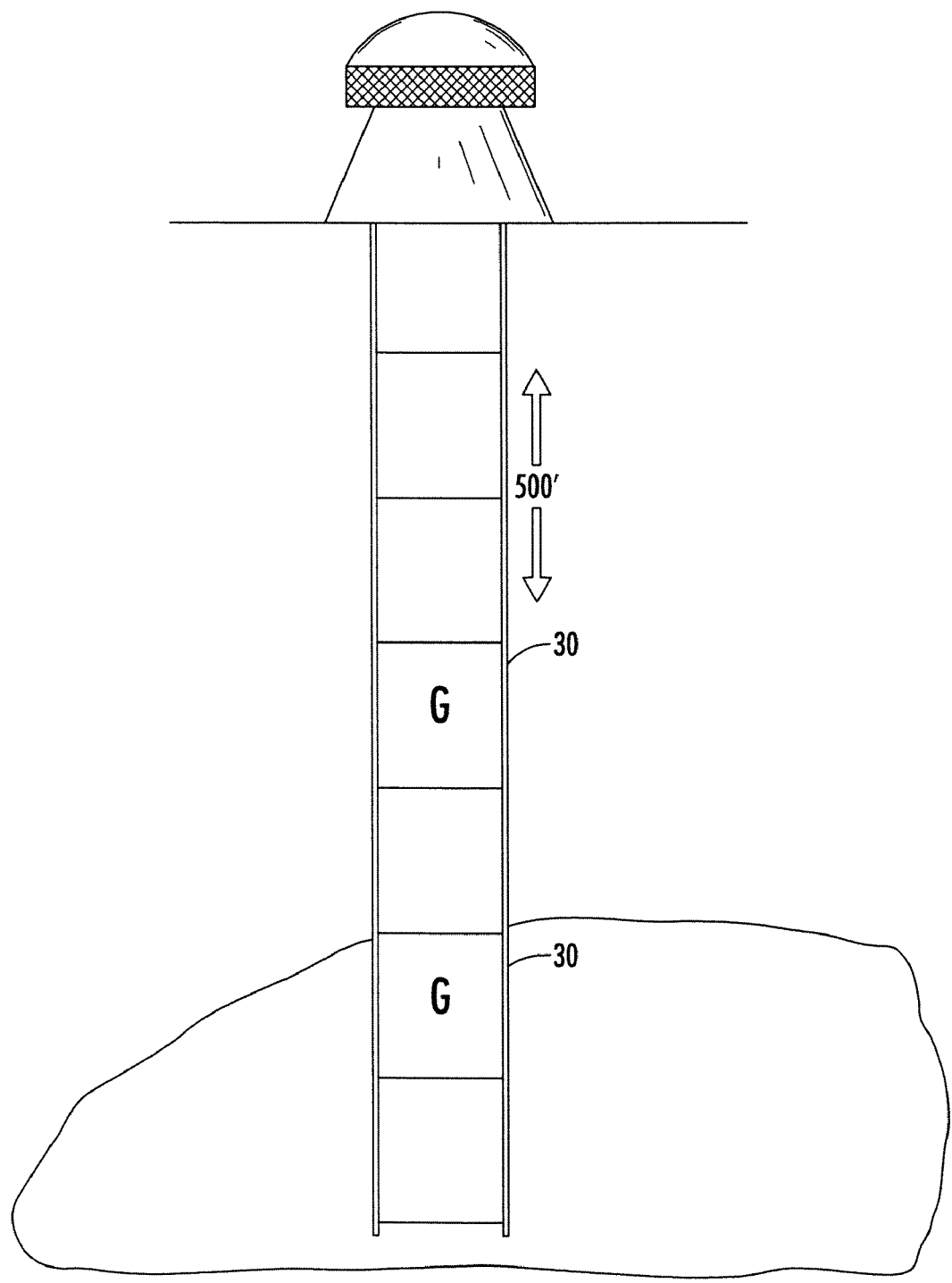
FIG. 5 is a schematic representation of the air induction chamber the insulated conduit with in line generators and the subterranean cavern.
Figure 6:
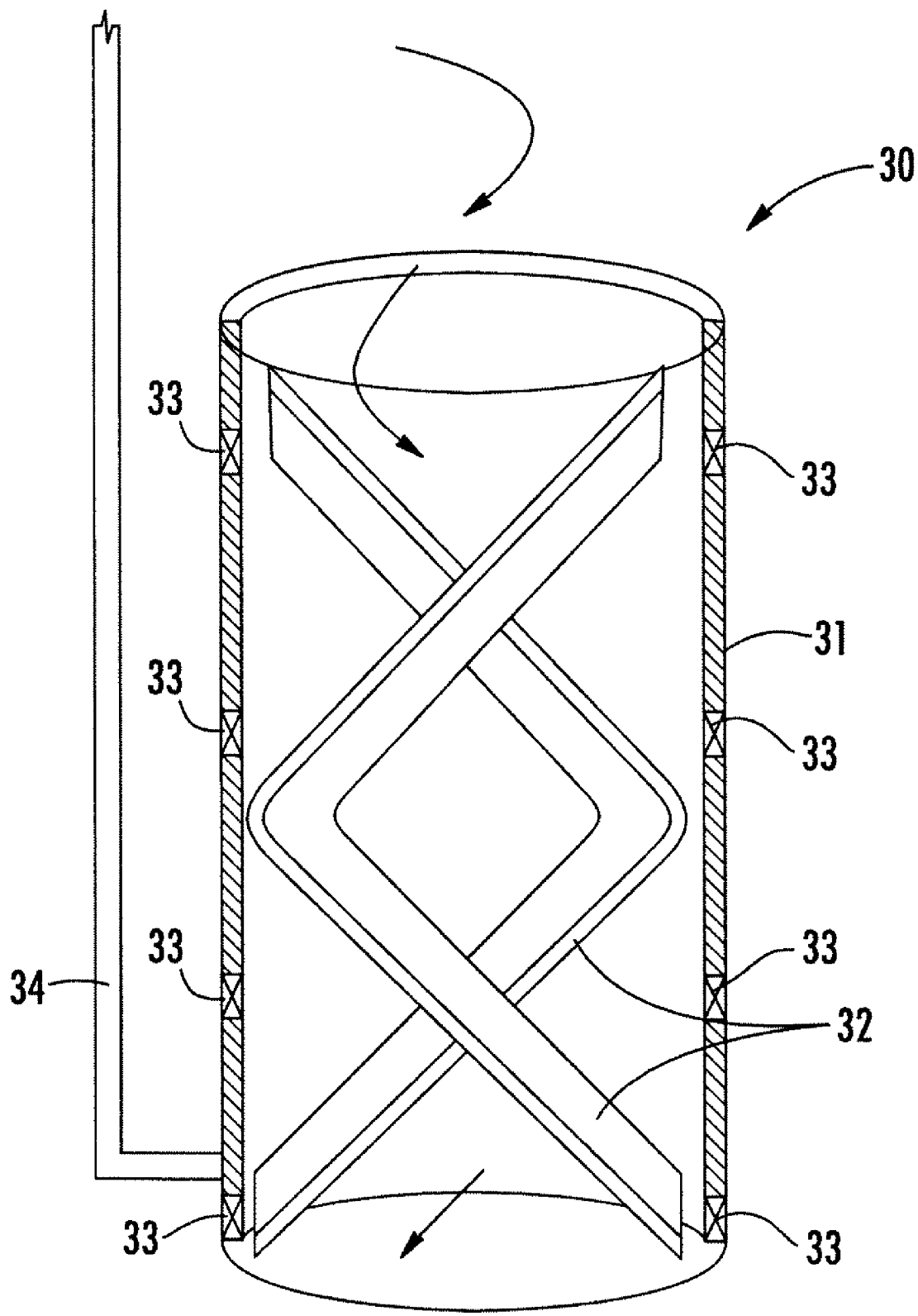
FIG. 6 is an illustration of a double helix cylinder wind turbine/generator.

As shown in FIGS. 2, 5 and 6 one or more low velocity wind turbine/generators 30 can be incorporated into the flow path of either or both of the insulated intake and exhaust conduits. These will be double-helix vane turbines designed to spin within the conduit with minimal air resistance. The turbines will be optimized to produce their maximum energy output as sustained wind-speeds of approximately 25-30 mph. Each generator will be capable of producing between 10-20 KW of electricity. The cylinder housing 31 is approximately six feet in diameter and 10 feet in length. It is interlocked with the adjacent conduit sections and is also permanently affixed to the walls of the substantially vertical intake and exhaust passages with rebar. The double helix blades 32 are aerodynamic metal vanes that spin freely as the air mass passes through the cylindrical housing 31. Electricity is produced as the blades spin within magnets 33 located within the wall of cylindrical housing 31. Electricity is subsequently transmitted via a line feed 34.

Once the cold ambient air has descended through the insulated air intake conduit it enters a conduit 80 in heat exchange with the subterranean cavern 3, as shown in FIG. 2. Conduit 80 thereby acting as a heat exchanger between the induced air flow and the geothermal temperature within the cavern. In some instances multiple caverns may be used where the air will be heated and processed. The preferred cavern(s) will be large open spaces that were previously mined and referred to as "stopes". The example cavern shown in the Smuggler Mine (FIG. 1) is over 2,500 feet long with an average height of over 100 feet. Assuming that the cavern is at least 100 feet wide, over 25 million cubic feet of space is available and this is only one of the numerous caverns already excavated underneath the surface. The cavern may also have connecting horizontal tunnels 7 previously dug and used to haul out ore deposits.

Almost every mine is going to have a water source that can be used. Some of the mines are at least partially flooded with shafts that are below the water table. Contaminated water can be pumped, filtered by filter 50, used and released as clean water. As shown in FIG. 2 water is pumped from the mine passed through filter 50 and then heated by heater exchanger 60. The heated water then flows to boiler 70 and is converted to steam. A small amount of steam will be used to start and perpetuate the vortex engine used in the exhaust energy production phase, as will be discussed below.

As the air passes through the cavern, a portion of the air flow will also pass through a series of carbon and ultraviolet filters that will cleanse the air and remove most pollutants. It is also proposed that $CO^2$ can be absorbed using a newly created technique developed by Professor Klaus Lackner of Columbia University and licensed from Global Research Technologies. The design offered by Global Technologies is a series of towers built above the earth's surface to collect carbon dioxide from the atmosphere. Rather than use this costly approach, utilizing the constant airflow and vast space of the caverns made available by the geothermal energy system collection and storage can be done much more efficiently underground. Since the filtering of the air and the carbon dioxide processing phase will necessarily impede the flow of air through the system, the conduit will branch and divert only a portion of the air for filtering and storage. In that regard, portions of the air can be compressed and stored for use during periods in which energy demand is higher or maximum energy potential cannot be derived from the naturally occurring airflow. This might occur when the temperature differential between the ambient surface air and the underground geothermal air is less than optimum levels. In this case, the air can be stored in a series of balloon-like containment vessels (not illustrated) and released on demand. As mentioned above, only portions of the total airflow can be diverted for filtering. Otherwise the natural air inducement process will be impeded. The air that can be filtered will enter a branch of the conduit, processed and returned to the energy producing component of the system. The carbon dioxide and other gases that are filtered will be sequestered and stored for either residual uses or disposal.

A vortex engine/tornado chamber would be constructed within the subterranean cavern as shown in FIG. 2. An example of a vortex engine which could be used in the geothermal power system of the instant invention is disclosed as an atmospheric vortex engine in U.S. Pat. No. 7,086,823, to Michaud, which is herein incorporated by reference. Combining a starter stream of steam and spinning the ducted warm air supply from conduit 80 in a chamber will produce a high velocity tornado effect that will be used to drive a specially designed wind turbine/generator 90. A tornado chamber 100 will be constructed in the cavern, leading to a substantially vertical exhaust shaft that exhausts the air back into the atmosphere at a low velocity. The tangential air entries around the base of the tornado chamber will receive the air supply from the conduit 80 located within the cavern. The convection process created within the tornado chamber will be similar to an exhaust fan, thus pulling more air from the atmosphere and producing greater velocity in the shaft. The larger diameter tornado chamber will either end at the top of the cavern or may extend into the substantially vertical exhaust shaft 4. The exhaust conduit 110 contained within the substantially vertical exhaust shaft 4 will be configured in a similar fashion to that of the intake conduit 20 previously described. Likewise, in a similar fashion lower velocity turbines/generators 130 can be placed in the exhaust conduit to create additional energy.

The insulated exhaust conduit 110 terminates at the surface of the earth and is covered and protected with a domed shaped structure 120 similar to the air induction chamber described above. The dome will act as a deflector distributing the flow of wind as it reenters the atmosphere. As an additional use, the warmed air can be used for other beneficial purposes. One possibility might be to create a large green house on the mine site property which is warmed by the sun and the exhausted air. Plants could also be grown hydroponically using the filtered water from the mine below. Additionally, some of the captured carbon dioxide could be introduced into the greenhouse, enhancing the growth and being converted back into oxygen by the natural photosynthesis process.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A geothermal power generation system comprising:
a man made underground mine;
an air inlet located at the surface of the earth;
air entering said air inlet at an ambient temperature;
a subterranean cavern located beneath the surface of the earth in said underground mine;
a heat exchanger located in said subterranean cavern;
said subterranean cavern having a naturally occurring geothermal temperature;
a first mine shaft defining a flow path for fluidly connecting the air inlet to said heat exchanger in said subterranean cavern whereby the air entering said air inlet passing through the heat exchanger is heated substantially to the geothermal temperature;
and a second mine shaft for fluidly connecting the air passing through the heat exchanger and an exhaust outlet at the surface of the earth;
said ambient temperature is substantially cooler than said geothermal temperature;
whereby a fluid flow is induced between the air entering said air inlet at said cooler ambient temperature, and the air passing through the heat exchanger that is heated to said geothermal temperature and said second mine shaft to an exhaust outlet at the surface of the earth; and
a power plant located in said flow path between the air inlet and the exhaust outlet that is powered by said induced fluid flow.

2. The geothermal power generation system defined by claim 1, wherein said power plant is located in the flow path defined by the first mine shaft.

3. The geothermal power generation system defined by claim 2, wherein one or more additional power plants are located in the first mine shaft.

4. The geothermal power generation system defined by claim 1, wherein said power plant is located in the second mine shaft.

5. The geothermal power generation system defined by claim 4, wherein one or more additional power plants are located in the second mine shaft.

6. The geothermal power generation system defined by claim 1, further including at least one additional power plant wherein said at least one power plant is located in the first mine shaft and said at least one power plant in located in the second mine shaft.

7. The geothermal power generation system defined by claim 1, wherein the air inlet is includes a bowl shaped inlet to impart a vortex flow to the air passing through the air inlet.

8. The geothermal power generation system defined by claim 1, wherein the first mine shaft includes an insulated conduit, said insulated conduit includes a helical rib extending inwardly from the inner surface of the conduit, whereby a swirling motion is imparted to the induced flow as it passes there through.

9. The geothermal power generation system defined by claim 1, wherein the output of said power plant is connected to an electrical generator.

10. The geothermal power generation system defined by claim 1, wherein the first and second mine shafts each include an insulated conduit that are formed from interlocking sections.

11. The geothermal power generation system defined by claim 1, wherein the power plant includes a set of double helix blades supported in the flow path.

12. The geothermal power generation system defined by claim 1, further including means to filter at least a portion of the air flow to remove carbon dioxide and other pollutants.

13. The geothermal power generation system defined by claim 1, further including means to filter ground water, and means to heat said filtered ground water prior to induction into the air flow.

14. The geothermal power system defined by claim 1, further including a tornado/vortex engine operatively connected to an electrical generator, said tornado/vortex engine having an inlet fluidly connected to the output of the cavern heat exchanger and an outlet fluidly connected to said exhaust outlet.

15. A method for converting subterranean geological formation into a geothermal power system comprising:
   identifying a man made mine formation that includes a subterranean cavern that has first and second mine shafts extending to the surface of the earth and whose subterranean cavern has a geothermal temperature substantially exceeding the average ambient temperature at the surface of the earth;
   providing an air inlet at the surface of the earth;
   installing a first flow path in the first mine shaft that is fluidly connected to the air inlet;
   installing a heat exchanger in the subterranean cavern and fluidly connecting a passageway within said heat exchanger to said first flow path and
   installing a second flow path in said second mine shaft to fluidly connect the passageway within the heat exchanger to an exhaust outlet at the surface of the earth and
   installing at least one power plant in either the first or second flow path;
   whereby air is induced to flow from the air inlet to the passageway within the heat exchanger and then to the exhaust outlet;
   said induced air flow providing the source of energy for said power plant.

16. A method for converting a subterranean geological formation into a geothermal power system as set forth in claim 15, wherein said geological formation is either an active or abandoned mine.

17. A method for converting a subterranean geological formation into a geothermal power system as set forth in claim 15, wherein plural power plants are installed in either the first or second flow path.

18. A method for converting a subterranean geological formation into a geothermal power system as set forth in claim 15, wherein plural power plants are installed in both the first and second flow paths.

19. A method for converting a subterranean geological formation into a geothermal power system as set forth in claim 15, including the step of driving an electrical generator with the output of the power plant.

20. A method for converting a subterranean geological formation into a geothermal power system as set forth in claim 15, further including the step of inducing a swirling motion to the air entering the inlet and flowing through the first flow path.

21. A method for converting a subterranean geological formation into a geothermal power system as set forth in claim 15, further including placing conduits in the first mine shaft and the second mine shaft and forming the conduits from a plurality of sections which are interlocked when located with the first and second mine shafts.

22. A method for converting a subterranean geological formation into a geothermal power system as set forth in claim 21, further including forming a radially inwardly extending helix on the inner wall of the conduit located in the first mine shaft to induce a swirling motion to the air flow.

23. A method for converting a subterranean geological formation into a geothermal power system as set forth in claim 15, further including forming a bowl shaped opening at the air inlet thereby generating a vortex flow.

24. A method for converting a mine into a geothermal power system comprising:
   identifying an abandoned or active mine, that includes a subterranean geological formation comprised of a subterranean cavern that has first and second mine shafts to the surface of the earth and whose subterranean cavern has a geothermal temperature substantially exceeding the average ambient temperature at the surface of the earth;
   securing a license from the property owner to build and operate said geothermal power system;
   providing an air inlet at the surface of the earth;
   installing a flow path in the first mine shaft that is fluidly connected to the air inlet;
   installing a heat exchanger in the subterranean cavern and fluidly connecting a passageway within said heat exchanger to said first flow path and
   installing a second flow path in said second mine shaft to fluidly connect the passageway within the heat exchanger to an exhaust outlet at the surface of the earth and
   installing at least one power plant in either the first or second flow path;
   whereby air is induced to flow from the air inlet to the passageway within the heat exchanger and then to the exhaust outlet;
   said induced air flow providing the source of energy for said power plant.

25. A method for converting a mine into a geothermal power system as set forth in claim 24, further comprising the step of:
   installing a tornado/vortex engine operatively connected to an electrical generator, said tornado/vortex engine having an inlet fluidly connected to the output of the cavern heat exchanger and an outlet fluidly connected to the insulated exhaust conduit.

26. A geothermal power generation system comprising:
   an air inlet located at the surface of the earth;
   air entering said air inlet at an ambient temperature;
   a subterranean chamber located beneath the surface of the earth;
   a heat exchanger located in said subterranean chamber;
   said subterranean chamber having a naturally occurring geothermal temperature;
   a first insulated conduit defining a flow path for fluidly connecting the air inlet to said heat exchanger in said subterranean chamber whereby the air entering said air inlet passing through the heat exchanger is heated substantially to the geothermal temperature; and a second insulated conduit fluidly connecting the air passing through the heat exchanger and an exhaust outlet at the surface of the earth;
   said ambient temperature is substantially cooler than said geothermal temperature;
   whereby a fluid flow is induced between the air entering said air inlet at said cooler ambient temperature, and the air passing through the heat exchanger that is heated to said geothermal temperature and said second insulated conduit to an exhaust outlet at the surface of the earth; and a power plant located in said flow path between the air inlet and the exhaust outlet that is powered by said induced fluid flow, and, further including means to filter ground water, and means to heat said filtered ground water prior to induction into the air flow.

* * * * *